(12) United States Patent
Fairbanks et al.

(10) Patent No.: US 10,929,861 B2
(45) Date of Patent: Feb. 23, 2021

(54) METHOD AND SYSTEM FOR MEASURING A CUSTOMER EXPERIENCE IN AN ORGANIZATION

(71) Applicant: Tata Consultancy Services Limited, Mumbai (IN)

(72) Inventors: Lisa E. Fairbanks, Atlanta, GA (US); Tonya L. McKinney, Atlanta, GA (US)

(73) Assignee: Tata Consultancy Services Limited, Mumbai (IN)

( * ) Notice: Subject to any disclaimer, the term of this patent is extended or adjusted under 35 U.S.C. 154(b) by 231 days.

(21) Appl. No.: 15/630,544

(22) Filed: Jun. 22, 2017

(65) Prior Publication Data

US 2017/0372333 A1 Dec. 28, 2017

(30) Foreign Application Priority Data

Jun. 23, 2016 (IN) .............................. 201621021654

(51) Int. Cl.
*G06Q 30/02* (2012.01)
*G06Q 50/00* (2012.01)
*G06F 16/22* (2019.01)
*G06F 40/30* (2020.01)

(52) U.S. Cl.
CPC ......... *G06Q 30/0201* (2013.01); *G06F 16/22* (2019.01); *G06F 40/30* (2020.01); *G06Q 50/01* (2013.01)

(58) Field of Classification Search
CPC .... G06Q 30/0201; G06Q 50/01; G06F 16/22; G06F 17/2785
See application file for complete search history.

(56) References Cited

U.S. PATENT DOCUMENTS

| | | | |
|---|---|---|---|
| 8,788,263 B1* | 7/2014 | Richfield | G06F 16/951 704/9 |
| 9,992,352 B2* | 6/2018 | Sharma | H04M 15/8044 |
| 2010/0138282 A1 | 6/2010 | Kannan et al. | |

(Continued)

OTHER PUBLICATIONS

Rai, A. K. (2003). A study of customer relationship management in banking industry (Order No. 10832497). Available from ProQuest Dissertations and Theses Professional. (2036390723). Retrieved from https://dialog.proquest.com/professional/docview/2036390723?accountid=161862 (Year: 2003).*

*Primary Examiner* — Tyler W Knox
*Assistant Examiner* — Nicholas D Bolen
(74) *Attorney, Agent, or Firm* — Finnegan, Henderson, Farabow, Garrett & Danner, LLP

(57) ABSTRACT

A system and method for measuring a customer experience across a plurality of business channels in an organization has been provided. The system is configured to provide insight into customer experience across business channels from data generated via social media. The social media data of the customer pertaining to the organization is acquired and cleansed to obtain the unstructured data. Using linguistic and behavioral analysis of unstructured social data, the system enables an organization to understand customer experience by a plurality of channel to market, including the relationship of the channels on customer experience. Finally, it was concluded that whether the customer expectations are matched, missed or exceeded with the organization.

12 Claims, 5 Drawing Sheets

(56) References Cited

U.S. PATENT DOCUMENTS

| | | | |
|---|---|---|---|
| 2012/0185544 A1 | 7/2012 | Chang et al. | |
| 2014/0365240 A1* | 12/2014 | Canton | G06Q 30/0201 |
| | | | 705/3 |
| 2015/0032503 A1* | 1/2015 | Chander | G06Q 30/0201 |
| | | | 705/7.29 |
| 2015/0046216 A1* | 2/2015 | Adjaoute | G06Q 20/384 |
| | | | 705/7.29 |
| 2015/0072335 A1* | 3/2015 | Pedanekar | G09B 5/00 |
| | | | 434/362 |
| 2015/0127426 A1 | 5/2015 | Chaudhry | |
| 2016/0085855 A1* | 3/2016 | Clark | G06F 16/35 |
| | | | 707/739 |
| 2016/0127539 A1* | 5/2016 | Sharma | H04M 15/08 |
| | | | 379/112.09 |
| 2016/0171514 A1* | 6/2016 | Frank | G06Q 50/12 |
| | | | 705/7.29 |
| 2016/0210602 A1* | 7/2016 | Siddique | G06Q 30/0601 |
| 2016/0253434 A1* | 9/2016 | Yu | G06F 16/90332 |
| | | | 707/760 |
| 2017/0085445 A1* | 3/2017 | Layman | G06T 11/206 |
| 2017/0249389 A1* | 8/2017 | Brovinsky | G06F 16/9535 |

\* cited by examiner

METHOD AND SYSTEM FOR MEASURING A CUSTOMER EXPERIENCE IN AN ORGANIZATION

CROSS-REFERENCE TO RELATED APPLICATIONS AND PRIORITY

The present application claims priority from Indian non-provisional specification no. 201621021654 filed on 23 Jun. 2016, the complete disclosure of which, in its entirety is herein incorporated by references.

TECHNICAL FIELD

The embodiments herein generally relates to the use of social media, and, more particularly unstructured data, as a method and system for measuring a customer experience using the analysis of social media profile and comments of the customer across a plurality of business channels

BACKGROUND

Social media is defined as "a group of Internet-based applications that build on the ideological and technological foundations of Web 2.0, and that allow the creation and exchange of user-generated content." Social media are media for social interaction Enabled by ubiquitously accessible and scalable communication techniques, social media substantially changes the way of communication between organizations, communities, as well as individuals.

Social media take on many different forms, including Internet forums, Weblogs, social blogs, microblogging, wikis, podcasts, photographs or pictures, video, rating, and social bookmarking. Many of these social media services can be integrated via social network aggregation platforms. Social media services focus on some or all of functional building blocks: identity, conversations, sharing, presence, relationships, reputation, and groups. These building blocks help understand the engagement needs of the social media audience.

In order for an organization such as a retail bank to accurately assess customer experience it must measure customer expectations, taking into account the channel of the interaction, for the purpose of understanding if its Meeting, Missing or Exceeding their customers overall expectations. To date, most retail banks are taking a siloed approach to measuring customer experience which means that they are using different key performance indicators (KPIs) for different channels. Furthermore, many retail banks are measuring customer experience using traditional data sources and traditional analysis techniques both of which, again, are managed by each individual channel. The result of these two trends of channel-specific assessment and traditional data/data sources—means that retail banks aren't getting a complete view of customer experience. The reality is that a customer's experience is comprised of the multiple interactions with a retail bank, regardless of channel.

In social media, customers discuss their experience across all interaction channels, which makes social data a great source for measuring the performance of an customer experience. However, assessing customer experience through social media is challenging because the data is unstructured. Furthermore, the traditional approach to social media measurement, commonly referred to as sentiment, does not provide a comprehensive and accurate assessment of customer experience because it strictly measures the positive/negative tone of a comment with no regard for context. For example, if a customer were to say The ATM on 1st and Washington is down we know through context of the experience, that the bank would have missed customer expectations because the customer assumed that the ATM would be operating.

Various methods exist in the prior art for measuring the customer experience. The limit to the prior art is that the customer experience insights are specific to business functions. For example, insights relating to agent competency focuses just on the agent channel. Insights related to offer acceptance focus just on the marketing function. Furthermore, the invention is comprised of a central data fusion engine for gathering customer service data from a plurality of sources and delivering business insights to clients by processing the data using one or more specific processing modules. While both structured and unstructured data is stored within the data fusion engine, the only analysis conducted on the unstructured data is to determine positive or negative customer experience which are then turned into Net Promoter Scores (NPS).

Given the significance of social media and the fact that customers discuss experience about every channel on social media (ATM, branch, mobile app, etc.) it would be advantageous to develop techniques that can measure the customer experience in an organization across various business channels.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In view of the foregoing, an embodiment herein provides a system for measuring customer experience across a plurality of business channels in an organization. The system comprises a memory, a processor and a display device. The processor is in communication with the memory. The processor further comprises an acquiring system, a data cleansing module, a linguistic analysis ontology unit and an additional linguistic analysis ontologies unit. The acquiring system acquires a social data from a plurality of social media comments made for and around an organization. The data cleansing module cleans the social data, removing duplicates, ensuring that the comments are those of customers vs. media, etc. The linguistic analysis ontology unit conducts a theme analysis on the unstructured data to categorize into the plurality of business channels. The additional linguistic analysis ontologies conducts an additional linguistic analysis to determine a plurality of channel themes corresponding to each of the plurality of business channels. The additional linguistic analysis ontologies unit further conducts additional linguistic analysis to determine customer expectations corresponding to each of the plurality of business channels and the plurality of channel themes. The display device displays the experience of the customer as at least one of an exceeded expectation, met expectation and a missed expectation based on the additional linguistic analysis.

In another aspect, an embodiment provides a processor implemented method for measuring a customer experience across a plurality of business channels in an organization. Initially a social data is acquired from a plurality of social media comments made for and around an organization by the customer. The social data is then cleansed by the processor for maintaining the data quality. In addition, duplicates is removed, to ensure that the comments are those of customers vs. media, etc. In the next step, a linguistic analysis is conducted on the unstructured data to categorize into the plurality of business channels. Further, an additional linguistic analysis is conducted to determine a plurality of channel themes corresponding to each of the plurality of business channels. In the next step, the additional linguistic analysis is conducted to determine customer expectations corresponding to each of the plurality of business channels and the plurality of channel themes. And finally, the experience of the customer is displayed on the display device as at least one of an exceeded expectation, met expectation and a missed expectation based on the additional linguistic analysis.

In another embodiment, a non-transitory computer-readable medium having embodied thereon a computer program for measuring a customer experience across a plurality of business channels in an organization. Initially a social data is acquired from a plurality of social media comments made for and around an organization by the customer. The social data is then cleansed by the processor for maintaining the data quality. In addition, duplicates is removed, to ensure that the comments are those of customers vs. media, etc. In the next step, a linguistic analysis is conducted on the unstructured data to categorize into the plurality of business channels. Further, an additional linguistic analysis is conducted to determine a plurality of channel themes corresponding to each of the plurality of business channels. In the next step, the additional linguistic analysis is conducted to determine customer expectations corresponding to each of the plurality of business channels and the plurality of channel themes. And finally, the experience of the customer is displayed on the display device as at least one of an exceeded expectation, met expectation and a missed expectation based on the additional linguistic analysis.

BRIEF DESCRIPTION OF THE DRAWINGS

The embodiments herein will be better understood from the following detailed description with reference to the drawings, in which.

The Figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF EMBODIMENTS

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
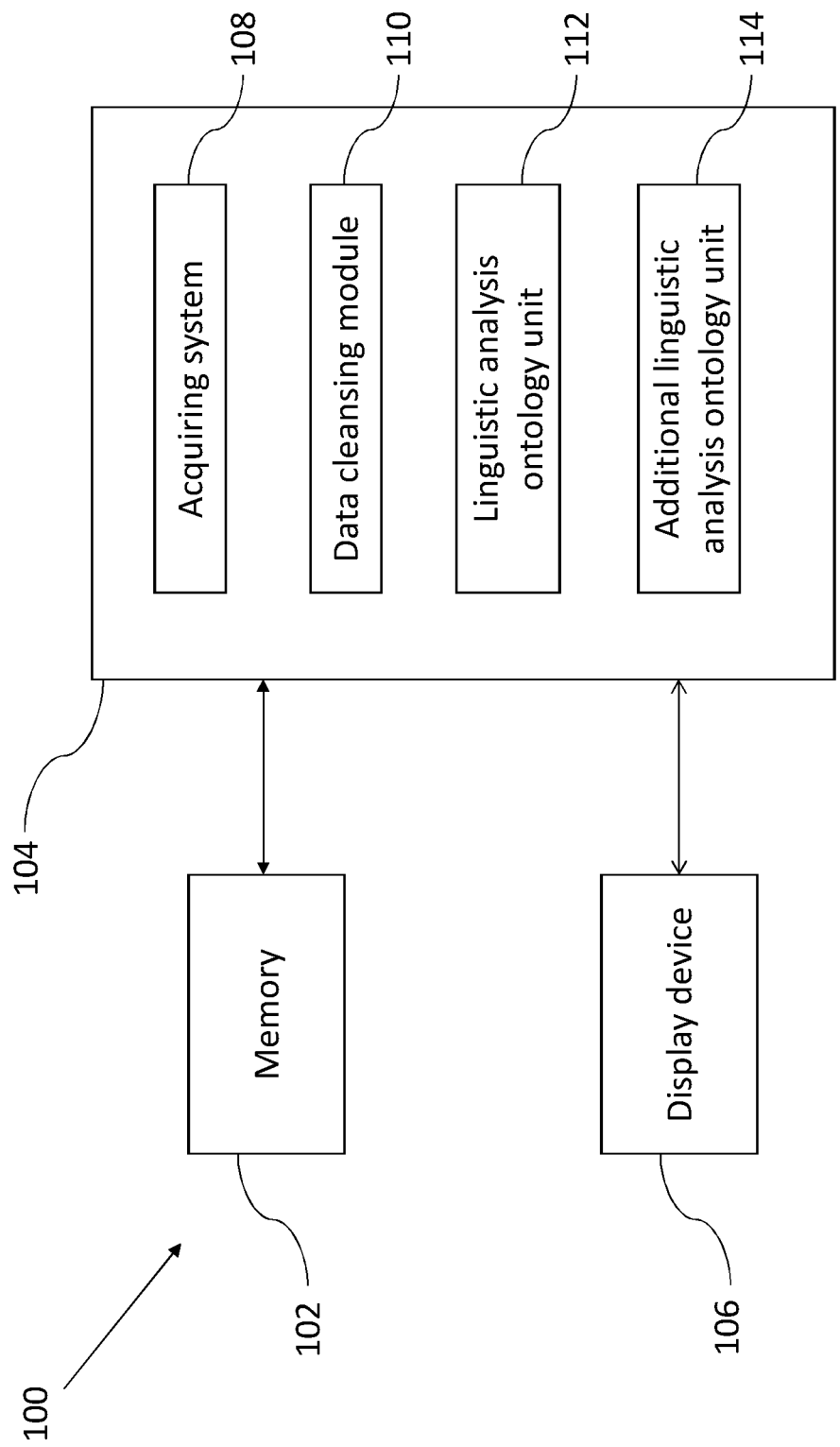
FIG. 1 illustrates a block diagram for measuring a customer experience across a plurality of business channels in an organization according to an embodiment of the present disclosure.

Referring now to the drawings, and more particularly to FIG. 1, where similar reference characters denote corresponding features consistently throughout the figures, there are shown preferred embodiments and these embodiments are described in the context of the following exemplary system and/or method.

According to an embodiment of the disclosure, a system 100 for measuring a customer experience across a plurality of business channels in an organization is shown in FIG. 1. The system 100 is configured to provide insight into customer experience across business channels from data generated via social media. Various embodiments of the present invention perform channel based analysis on customer expectations collected via social media. The system 100 takes organizational data from various sources and social media data. In an embodiment, the invention is proposed for retail banking. Though it should be appreciated that the invention can also be used for any other organization such as an insurance company, or any other service providing company. It should also be appreciated that the invention can also be used for other types of unstructured data sources.

The system 100 primarily includes a memory 102, a processor 104 and a display device 106. The processor 104 further includes a plurality of modules for performing various functions in the system 100. The processor 104 is in communication with the memory 102, the processor 104 executes the algorithm stored in the memory 102 to perform various functions. The processor 104 includes an acquiring system 108 or acquiring module 108, a data cleansing module 110, a linguistic analysis ontology unit 112 and an additional linguistic analysis ontology unit 114.

According to an embodiment of the disclosure, the acquiring system 108 is configured to acquire a social data from a plurality of social media references to an organization—these are references that a customer may use when referring to an organization, which doesn't always adhere to proper social handles. For example, Fifth Third bank's proper Twitter handle is @FifthThird but customers may refer to is at "FifthThird, #FifthThird, $5/3^{rd}$, #$5/3^{rd}$, @$5/3^{rd}$" All of the interactions used by customers to refer to a brand must be built. The social data is taken from at least one of a Facebook, LinkedIn, Twitter, Myspace, Instagram, Quora, blogsite and Google profile of the organization. It should be appreciated the data can also be taken from any other social media website. The data cleansing module 110 is configured to clean the social data acquired by the acquiring system 108.

According to an embodiment of the disclosure, the linguistic analysis ontology unit 112 is configured to conduct a theme analysis on the unstructured data to categorize into the plurality of business channels. The plurality of business channels are chosen depending on the type of organization. Further, the additional linguistic analysis ontologies unit 114 is configured to conduct an additional linguistic analysis to determine a plurality of channel themes corresponding to each of the plurality of business channels. The invention determines the primary plurality of themes contained within the unstructured data which is completely contingent on what the customer has written in the social data, i.e., it's not a pre-existing categorization of terms. The additional linguistic analysis ontologies unit 114 further configured to conduct additional linguistic analysis to determine customer expectations corresponding to each of the plurality of business channels and the plurality of channel themes.

According to an embodiment of the disclosure, the display device 106 is configured to display the experience of the customer. The customer experience can be as at least one of an exceeded expectation, met expectation and a missed expectation based on the additional linguistic analysis. The system 100 assess customer experience across all business channels and analyzes unstructured data beyond sentiment to determine the customer expectation. The display device 106 is further configured to display additional information as per the requirement of the user.

Figure 2:
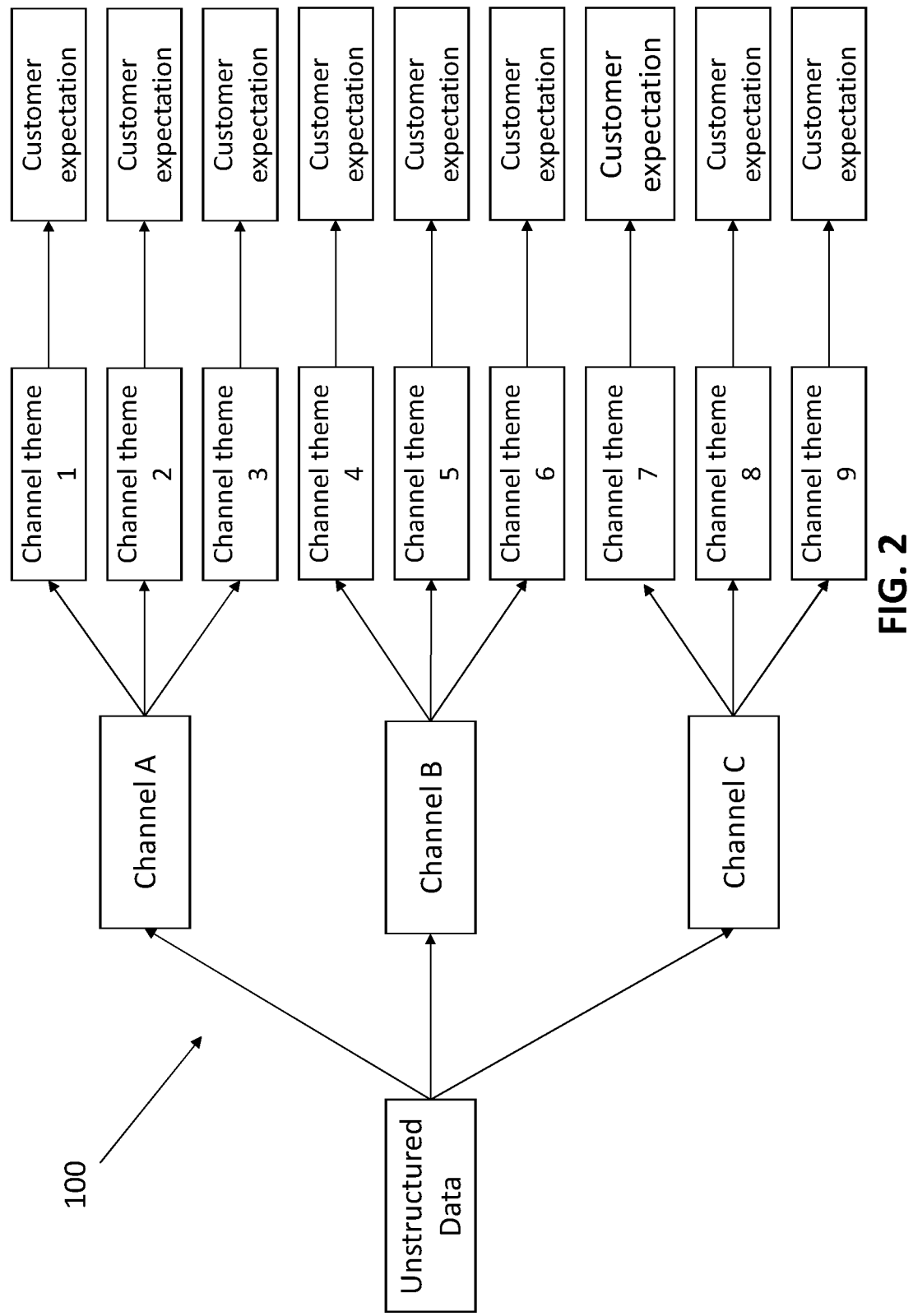
FIG. 2 illustrates the hierarchy of the data according to an embodiment of the present disclosure.

According to an embodiment of the disclosure, a framework has been designed to categorize unstructured data into customer experience criteria and expectations by business channel. FIG. 2 illustrates the hierarchy in accordance with an embodiment of the present disclosure. The framework is comprised of more than 4,000 linguistic and behavioral rules that categorize unstructured social data. The framework is designed in a hierarchy to show parent/child relationship among three areas, i.e., a plurality of business channels, a plurality of channel themes and the customer expectations.

According to an embodiment of the disclosure, the system 100 is explained in detail with the help of retail banking industry. As shown in the FIG. 3, based on the theme analysis performed on the unstructured data by the linguistic analysis ontology unit 112 a plurality of channels are identified. Theme analysis identifies the plurality of channels through which the customer can interact with the bank. This results in generation of 5 channels for the retail bank as follows: Channel A as mobile application, channel B as online banking, channel C as ATM, channel D as Branch and channel E as call center. It should be appreciated that for any other organization, the plurality of channels can be less or more than the plurality of channels for the retail banking.

Figure 3:
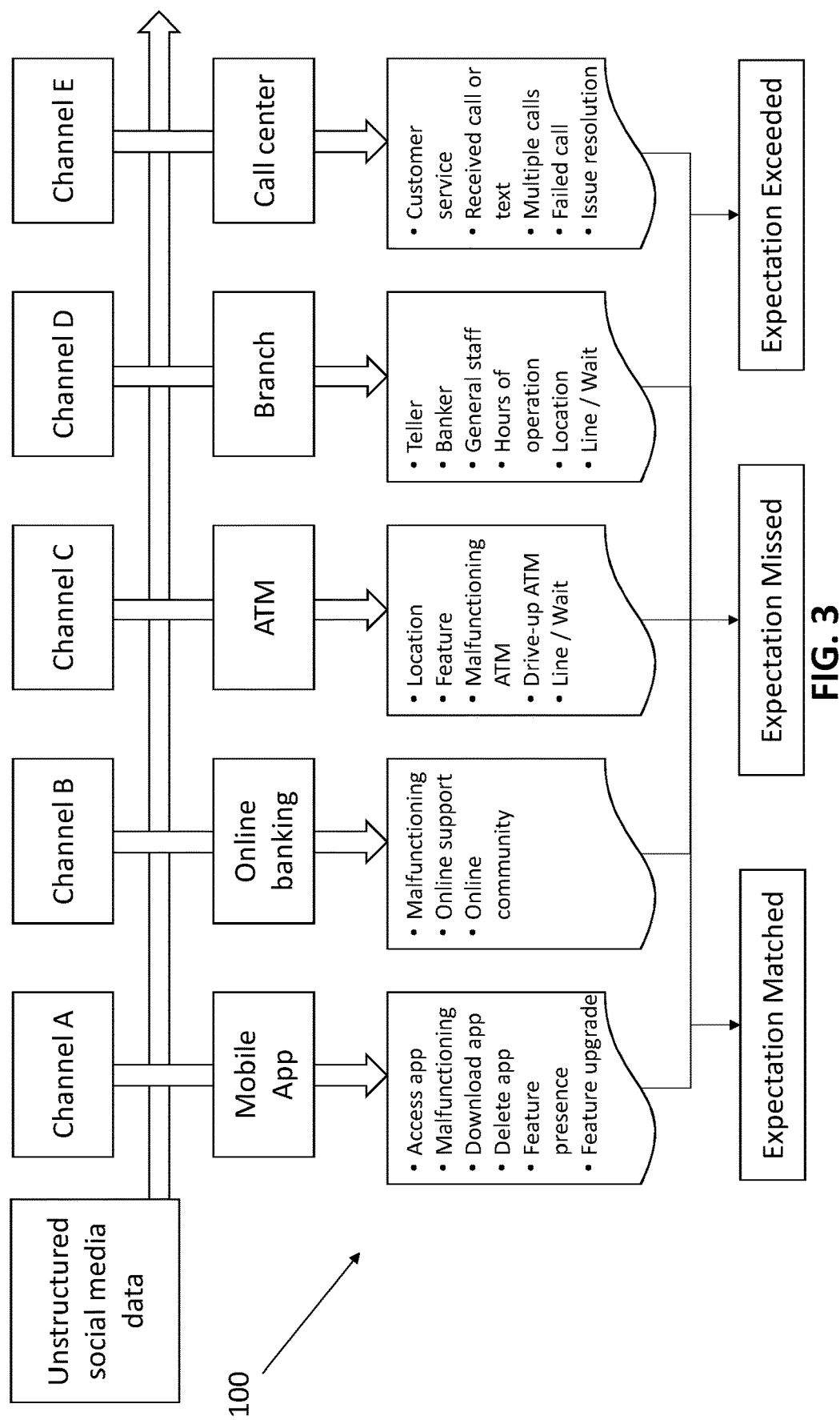
FIG. 3 shows schematic representation of the plurality of themes associated with each of the plurality of business channels, according to an embodiment of the present disclosure.

Further, as shown in FIG. 3 additional linguistic analysis is performed on each of the plurality of channels to identify the plurality of channel themes. In the present embodiment, the plurality of channel themes corresponding to mobile app includes issues related to accessibility to the app, malfunctioning, download app, delete app, feature presence or feature upgrade etc. It should be appreciated that the system 100 is not constricted to these themes related to the mobile app as it is a constantly changing area for customers. The plurality of channel themes corresponding to the online banking includes issues related to malfunctioning of the website, online support, online community etc. It should be appreciated that the system 100 is not constricted to these themes related to the online banking as it is a constantly changing area for customers.

The plurality of channel themes corresponding to ATM includes issues related to location of the ATM, features of ATM, malfunctioning ATM, drive-up, Line/or waiting in the ATM etc. It should be appreciated that the system 100 is not constricted to these themes related to the ATM as it is a constantly changing area for customers. The plurality of channel themes corresponding to branch banking includes issues related to teller, banker, general staff of the bank, hours of bank operation, location, line/wait etc. It should be appreciated that the system 100 is not constricted to these themes related to the branch banking as it is a constantly changing area for customers. The plurality of channel themes corresponding to call center includes issues related to customer service, received call or text, multiple calls, failed calls, issue resolution etc. It should be appreciated that the system 100 is not constricted to these themes related to the call center as it is a constantly changing area for customers.

Further, according to an embodiment of the invention, the additional linguistic analysis is performed once again to determine customer expectations corresponding to each of the plurality of business channels and the plurality of channel themes. The customer expectations can be either 'Met', 'Missed' or 'Exceeded'. The same is determined for each of the plurality of business channels and each of the plurality of channel themes. This information can be displayed on the display device 106 or screen. The display device 106 can be customized as per the requirement of the user. The display device 106 can show how each channel (Branch, Online, Call Center, App and ATM) is Exceeding, Meeting or Missing Customer Expectations for a specific bank in the graphical form Further, the system 100 relates to measuring holistic customer experience, not all findings generate a recommendation that an agent can simply offer the customer to improve his/her experience. For example, the present embodiment illustrates that a criteria driving customer experience within an ATM channel is the proximity of the ATM to the customer. An agent cannot simply extend an offer of a closer ATM to the customer.

Figure 4:
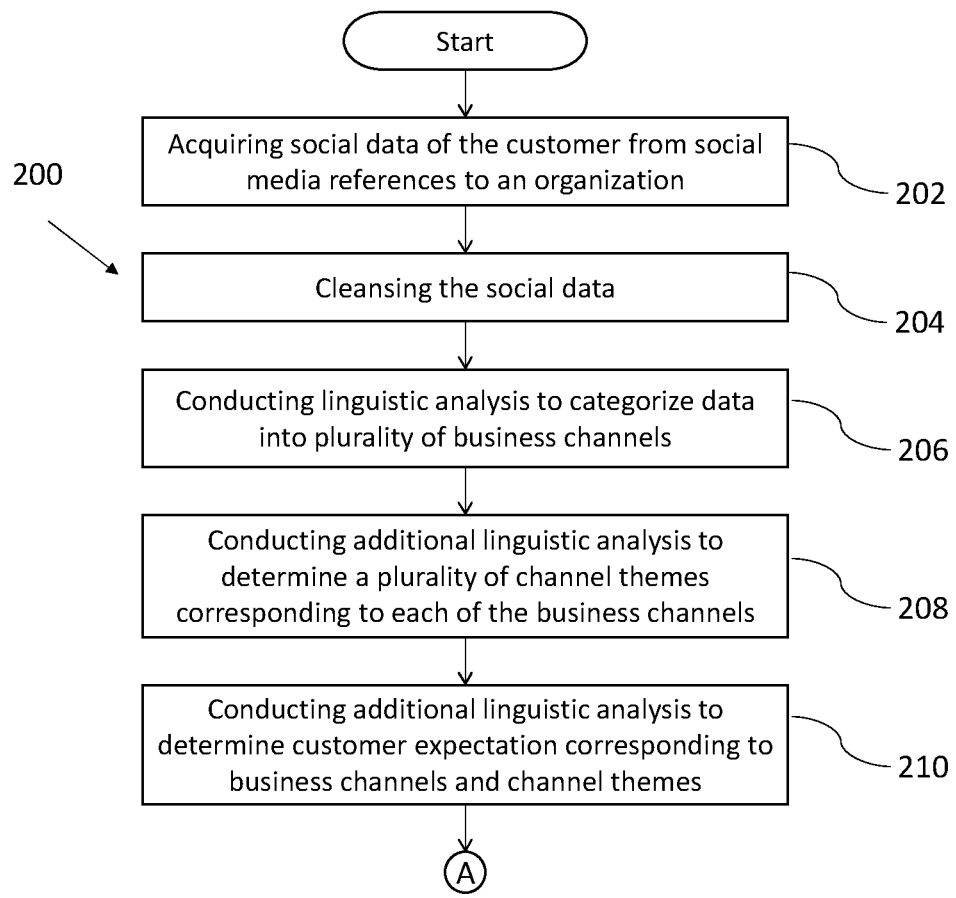
FIG. 4 is a flowchart illustrating the steps involved for measuring the customer experience across a plurality of business channels in an organization according to an embodiment of the present disclosure.
Figure 4:
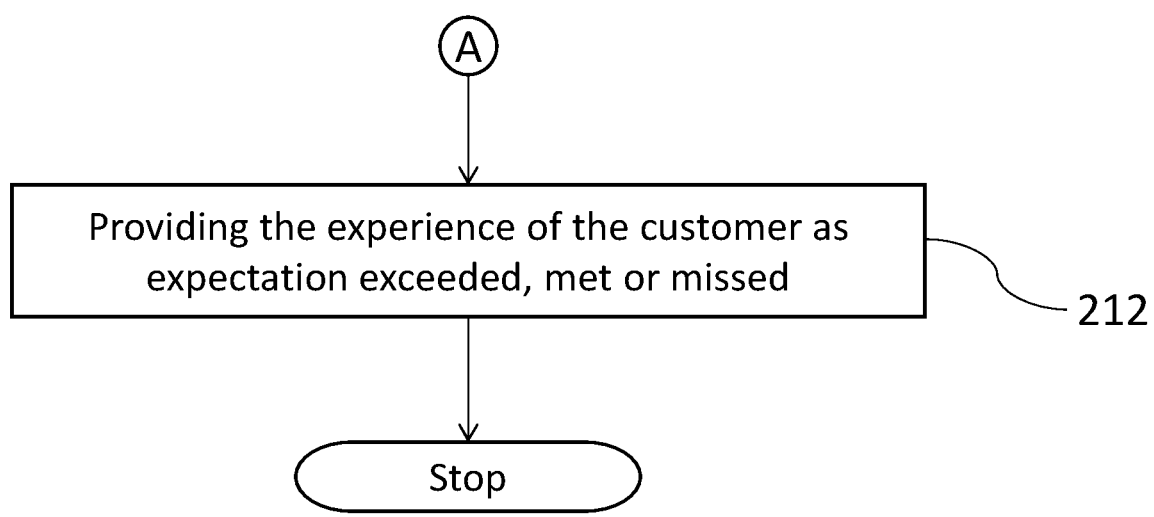

In operation, a flowchart 200 illustrating the steps involved for measuring the customer experience across the plurality of business channels in the organization is shown in FIG. 4. Initially at step 202, a social data of the customer is acquired from a plurality of social media references to an organization—these are references that a customer may use when referring to an organization, which doesn't always adhere to proper social handles. Generally the social data is taken from at least one of a Facebook, LinkedIn, Twitter, Myspace, Instagram, Quora, blogsite and Google profile of the customer. It should be appreciated the data can also be taken from any other social media website.

At step 204, the social data of the customer is cleansed by the data cleansing module 110 present in the processor 106. The data cleansing is performed to maintain the data quality. In various examples, the data cleansing may include correcting spelling mistakes or grammatical error, changing the slang language with formal language, for example, changing "u" with "you". After the data cleansing the data obtained is unstructured data.

At step 206, the linguistic analysis is performed on the unstructured data using the linguistic analysis ontology unit 112. The linguistic analysis categorizes the unstructured data into the plurality of business channels corresponding to the organization. At step 208, the additional linguistic analysis is performed by the additional linguistic analysis ontologies unit 114. The additional linguistic analysis determines the plurality of channel themes corresponding to each of the plurality of business channels, which were determined in the previous step. At step 210, the additional linguistic analysis is performed further to determine customer expectations corresponding to each of the plurality of business channels and the plurality of channel themes. And finally at step 212, the experience of the customer is displayed on the display device 106. The experience of the customer can be expressed as at least one of an exceeded expectation, met expectation and a missed expectation based on the additional linguistic analysis.

According to various embodiments of the present disclosure, the system 100 provides various benefits. The system 100 decreases the time spent assessing multichannel data housed in various data sources. The system 100 improves visibility of reports by developing application on the customer's existing enterprise platform, such as Salesforce. The system 100 further increases relevance of insights by building custom data objects specifically designed for the clients business. The system 100 decreases time required to format and perform quality assurance on raw date from days to hours using an automated data cleansing script responsible for data parsing, category parsing, geo-mapping and duplicate removal. The system 100 speeds up the time to resolution through direct integration with enterprise. The system 100 also allows users to quickly open service tickets that can be tracked from problem through to resolution. Increases the time to value of insights areas for actions direct integration with Enterprise Collaboration systems allowing cross functional teams to discuss trends and identify solutions. Finally the system 100 increases speed of report availability from days to hours by leveraging system APIs for automated data loads.

According to an embodiment of the disclosure, the system 100 can also be designed for of comparing the customer experience measured for more than one organizations. In the case, the system 100 can analyze the data collected from plurality of organizations and display it on the display device how each channel is Exceeding, Meeting or Missing Customer Expectations across each of the plurality of organizations.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of measuring customer experience. The embodiment, thus provides the system and method for measuring the customer experience across the plurality of business channels in the organization.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

What is claimed is:

1. A method for measuring a customer experience across a plurality of business channels in an organization, the method comprising processor implemented steps of: acquiring by the processor, a social data from a plurality of social media references that the customer considered when referring the organization;
cleansing by the processor, the social data for maintaining the data quality by correcting spelling mistakes, changing a slang language with a formal language to obtain an unstructured data, and ensuring measurement is of customer conversation not promotions or media, thereby decreasing time required to format and perform quality assurance on raw data from days to hours using an automated data cleansing script responsible for data parsing, category parsing, geo-mapping and duplicate removal;
conducting by a natural Language Processing Tool, a linguistic analysis on the unstructured data to categorize into the plurality of business channels through which the customer interacted with the organization, wherein the plurality of business channels includes a mobile application, an online bank, an Automated Teller Machine (ATM), a bank branch, and a call center;
conducting by the processor, an additional linguistic analysis to determine a plurality of channel themes contained within the unstructured data corresponding to issues faced by the customer including a location of the ATM, malfunctioning of the ATM while accessing the ATM and also includes issues related to customer service, received call or text, multiple calls, failed calls, an issue resolution while accessing the call center;
conducting by the processor, the additional linguistic analysis to determine customer expectations by analyzing the unstructured data beyond sentiment corresponding to each of the plurality of business channels and the plurality of channel themes, wherein the unstructured data is categorized by a framework designed in a hierarchy to show parent and child relationships among the plurality of business channels, the plurality of channel themes, and the customer expectations, wherein a criterion that drives the customer experience is considered in accordance with the issues faced by the customer while accessing the business channel;
providing by the processor, the experience of the customer as at least one of an exceeded expectation, met expectation and a missed expectation based on the additional linguistic analysis on a display device;
and comparing by the processor, data pertinent to the experience of the customer collected from multiple organizations and displaying a progress of each channel with respect to the at least one of exceeding expectation, meeting expectation, missing expectation across each of the multiple organizations on the display device.

2. The method of claim 1, wherein the organization is a retail bank.

3. The method of claim 1 further comprising the step of comparing the customer experience measured for more than one organizations.

4. A system for measuring a customer experience across a plurality of business channels in an organization, the system comprising: a memory; a processor in communication with the memory, the processor is configured to, acquire a social data from a plurality of social media references that the customer considered when referring the organization;
clean the social data by correcting spelling mistakes, changing a slang language with a formal language to obtain an unstructured data, and ensuring measurement is of customer conversation not promotions or media, thereby decreasing time required to format and perform quality assurance on raw data from days to hours using an automated data cleansing script responsible for data parsing, category parsing, geo-mapping and duplicate removal;
conduct a theme analysis on the unstructured data to categorize into the plurality of business channels through which the customer interacted with the organization, wherein the plurality of business channels includes a mobile application, an online bank, an Automated Teller Machine (ATM), a bank branch, and a call center;
conduct an additional linguistic analysis to determine a plurality of channel themes contained within the unstructured data corresponding to issues faced by the customer includes a location of the ATM, malfunctioning of the ATM while accessing the ATM and includes issues related to customer service, received call or text, multiple calls, failed calls, an issue resolution while accessing the call center;
and conduct additional linguistic analysis to determine customer expectations by analyzing the unstructured data beyond sentiment corresponding to each of the plurality of business channels and the plurality of channel themes, wherein the unstructured data is categorized by a framework designed in a hierarchy to show parent and child relationships among the plurality of business channels, the plurality of channel themes, and the customer expectations, wherein a criterion that drives the customer experience is considered in accordance with the issues faced by the customer while accessing the business channel;
a display device displaying the experience of the customer as at least one of an exceeded expectation, met expectation and a missed expectation based on the additional linguistic analysis;
wherein the processor is further configured to, compare data pertinent to the experience of the customer collected from multiple organizations;
and wherein the display device displays a progress of each channel with respect to the at least one of exceeding expectation, meeting expectation, missing expectation across each of the multiple organizations.

5. The system of claim 4 further comprises a database for storing the acquired social data.

6. A non-transitory computer-readable medium having embodied thereon a computer program for measuring a customer experience across a plurality of business channels in an organization, the method comprising: acquiring by the processor, a social data from a plurality of social media references that the customer considered when referring the organization;
cleansing by the processor, the social data for maintaining the data quality by correcting spelling mistakes, changing a slang language with a formal language to obtain an unstructured data, and ensuring measurement is of customer conversation not promotions or media, thereby decreasing time required to format and perform quality assurance on raw data from days to hours using an automated data cleansing script responsible for data parsing, category parsing, geo-mapping and duplicate removal;

conducting by a natural Language Processing Tool, a linguistic analysis on the unstructured data to categorize into the plurality of business channels through which the customer interacted with the organization, wherein the plurality of business channels includes a mobile application, an online bank, an Automated Teller Machine (ATM), a bank branch, and a call center;

conducting by the processor, an additional linguistic analysis to determine a plurality of channel themes contained within the unstructured data corresponding to issues faced by the customer includes a location of the ATM, malfunctioning of the ATM while accessing the ATM and includes issues related to customer service, received call or text, multiple calls, failed calls, an issue resolution while accessing the call center each of the plurality of business channels;

conducting by the processor, the additional linguistic analysis to determine customer expectations by analyzing the unstructured data beyond sentiment corresponding to each of the plurality of business channels and the plurality of channel themes, wherein the unstructured data is categorized by a framework designed in a hierarchy to show parent and child relationships among the plurality of business channels, the plurality of channel themes, and the customer expectations, wherein a criterion that drives the customer experience is considered in accordance with the issues faced by the customer while accessing the business channel;

providing by the processor, the experience of the customer as at least one of an exceeded expectation, met expectation and a missed expectation based on the additional linguistic analysis on a display device;

and comparing by the processor, data pertinent to the experience of the customer collected from multiple organizations and displaying a progress of each channel with respect to the at least one of exceeding expectation, meeting expectation, missing expectation across each of the multiple organizations on the display device.

7. The method of claim 1, wherein the display device is customized as per the requirement of a user.

8. The method of claim 1, wherein the display device shows progress of each business channel as exceeding, meeting expectation, missing expectation for the organization in a graphical form.

9. The method of claim 3, wherein the display device shows progress of each business channel as exceeding, meeting expectation, missing expectation across each of the organizations.

10. The system of claim 4, wherein the display device is customized as per the requirement of a user.

11. The system of claim 4, wherein the display device shows progress of each business channel as exceeding, meeting expectation, missing expectation for the organization in a graphical form.

12. The system of claim 4, wherein the display device shows progress of each business channel as exceeding, meeting expectation, missing expectation across a plurality of organizations.

* * * * *